United States Patent

Frauchiger et al.

[11] Patent Number: 5,856,648
[45] Date of Patent: Jan. 5, 1999

[54] METHOD AND APPARATUS FOR PRODUCING WELLS IN THE SURFACE OF A ROTOGRAVURE CYCLINDER WITH A LASER

[75] Inventors: Jakob Frauchiger, Hilterfingen; Andreas C. Brockelt; Guido Hennig, both of Wynau, all of Switzerland

[73] Assignee: MDC Max Datwyler Bleienbach AG, Bleienbach, Switzerland

[21] Appl. No.: 765,089
[22] PCT Filed: Apr. 12, 1996
[86] PCT No.: PCT/CH96/00130
§ 371 Date: Dec. 20, 1996
§ 102(e) Date: Dec. 20, 1996
[87] PCT Pub. No.: WO96/34718
PCT Pub. Date: Nov. 7, 1996

[30] Foreign Application Priority Data

May 3, 1995 [CH] Switzerland .............................. 1262/95

[51] Int. Cl.⁶ .................................................... B23K 26/08
[52] U.S. Cl. ................................ 219/121.61; 219/121.68; 219/121.76
[58] Field of Search .............................. 219/121.7, 121.6, 219/121.61, 121.62, 121.68, 121.69, 121.78, 121.75, 121.8, 121.76, 121.77, 121.85, 121.71

[56] References Cited

U.S. PATENT DOCUMENTS

| | | | |
|---|---|---|---|
| 4,322,600 | 3/1982 | Crahay | 219/121.76 |
| 4,581,617 | 4/1986 | Yoshimoto et al. | 347/239 |
| 4,801,950 | 1/1989 | Frehling | 347/239 |
| 4,947,023 | 8/1990 | Minamida et al. | 219/121.68 |
| 5,041,716 | 8/1991 | Wakabayashi | 219/121.68 |
| 5,279,775 | 1/1994 | Thomas et al. | 219/121.61 |
| 5,391,856 | 2/1995 | Minamida et al. | 219/121.68 |
| 5,416,298 | 5/1995 | Robert | 219/121.68 |
| 5,459,505 | 10/1995 | Ballegaard et al. | 347/260 |

FOREIGN PATENT DOCUMENTS

| | | |
|---|---|---|
| 42 12 390 | 10/1993 | Germany . |
| WO 92/09399 | 6/1992 | WIPO . |
| WO 93/25387 | 12/1993 | WIPO . |

*Primary Examiner*—Gregory L. Mills
*Attorney, Agent, or Firm*—Bell Seltzer Intellectual Property Law Group of Alston & Bird llp

[57] ABSTRACT

A method and a device for particularly rapidly producing wells (18) in the surface of a rotating rotogravure cylinder (2) by a pulsed laser beam (13), which is deflected and directed via an optical lens (7) onto the surface of the rotogravure cylinder (2) to be processed. The power of a single laser beam pulse is adjusted in such a way that it is sufficient for removing the maximum volume needed for a well (18). Furthermore, the laser beam (13) is deflected by an optoacoustic modulator (8) by diffraction onto the optical axis of the lens (7), and the individual laser beam pulses are controlled in their pulse power by the same modulator (8) in accordance with the volumes of the wells to be formed.

9 Claims, 3 Drawing Sheets

METHOD AND APPARATUS FOR PRODUCING WELLS IN THE SURFACE OF A ROTOGRAVURE CYCLINDER WITH A LASER

BACKGROUND OF THE INVENTION

The invention relates to a method and an apparatus for producing wells in the surface of a rotogravure cylinder.

Such a method and such an apparatus are known, for example, from WO-A-92/09399. There the rotogravure cylinder is rotated by a rotational drive at a constant rotational speed and is processed by a laser light source so that wells are produced in its surface. The laser beam emitted as a continuous wave is pulsed by a laser control and is controlled in its power. A processing head, comprising a mirror, an optoacoustic modulator and an optical lens, is moved along the rotogravure cylinder. The pulsed laser beam is deflected by the mirror and adjusted by the optoacoustic modulator to correspond to the rotational speed, and directed in a specific processing mode onto the surface of the rotogravure cylinder. The optoacoustic modulator is likewise controlled by the laser control. It is pointed out specifically that it is hardly possible to carry out processing of adjacently located wells since breaches to the adjacent well can occur due to the intense local heating of the cylinder surface. For this reason, a processing mode is proposed, in which the laser beam is deflected by the optoacoustic modulator in such a way that, for example, starting from a hollowed-out well, firstly two intended wells are missed out forwards and the following well is hollowed out, and then two intended wells are missed out backwards and the following well is hollowed out. The hollowed-out wells have thus cooled down sufficiently to produce an adjacent well without breaches in the wall. In the event of the energy being insufficient to hollow out a relatively large well, the laser beam is directed onto it again subsequently after cooling. The person skilled in the art can assume from all these tasks that the rotational speed of the rotogravure cylinder must be relatively slow and the processing time for an individual well must be relatively long.

The present invention is based on the object of specifying a method and a device for producing wells in the surface of a rotogravure cylinder, which allow far more rapid processing of directly adjacent wells.

SUMMARY OF THE INVENTION

The above and other objects and advantages of the present invention are achieved by a method and apparatus wherein a pulsed laser beam is directed into an optoacoustic modulator, which deflects the laser beam by diffraction into the optical axis of a lens via an optical waveguide. From the lens, the beam is directed onto the surface of a rotating rotogravure cylinder to produce wells in the surface.

The invention is based on the knowledge that the power of the laser light source may be adjusted in such a way that the maximum volume needed for a well can be removed using a single laser beam pulse with a short pulse length. To remove a lesser volume of a well, the energy required to do so is adjusted by an optoacoustic modulator, i.e. the intensity of the laser beam pulse is defined on the basis of the electrical RF power applied to the modulator. This type of power control is far faster than the conventional type with an electromechanical or optoelectrical device which has a delayed response time and functions less precisely at higher speeds.

BRIEF DESCRIPTION OF THE DRAWINGS

Some of the objects and advantages of the present invention having been stated, others will appear when the following description is considered together with the accompanying drawings, in which.

DETAILED DESCRIPTION OF THE PREFERRED EMBODIMENTS

Figure 1:
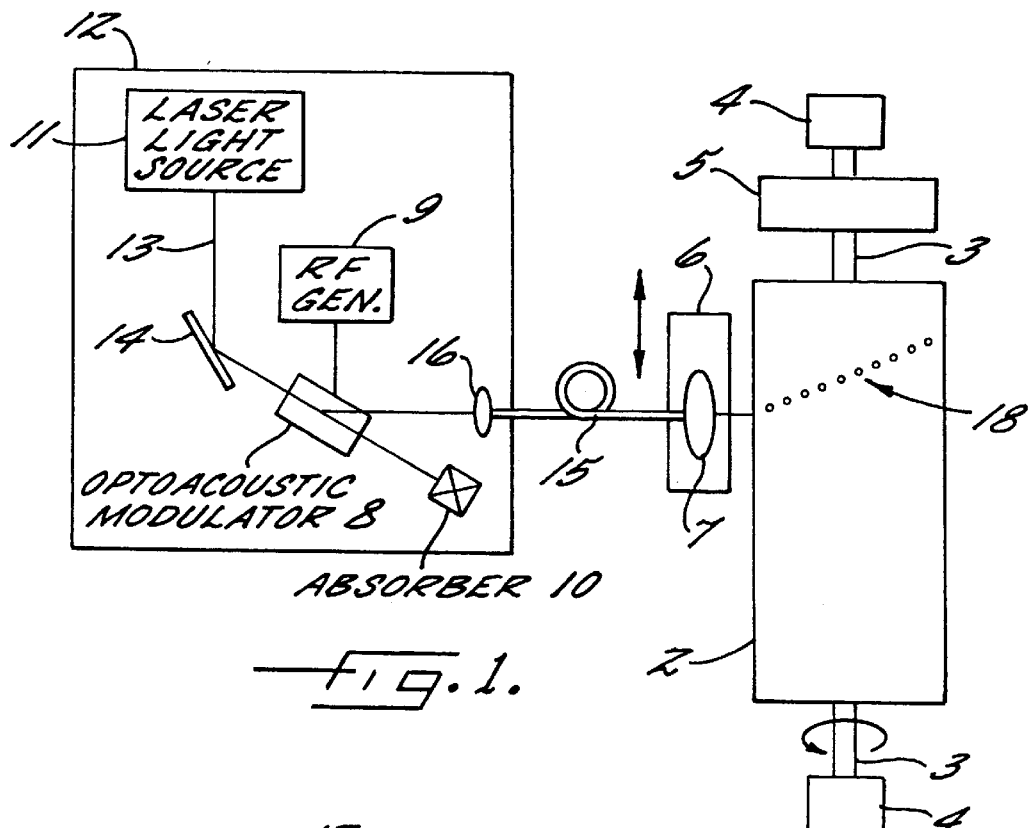
FIG. 1 shows a laser engraving machine with a rotogravure cylinder to be processed with a laser light source.

In the figures, the same reference numerals are used in each case for the same elements, and explanations of the elements given first apply to all figures unless stated expressly otherwise.

FIG. 1 illustrates purely diagrammatically a laser engraving machine for a rotogravure cylinder 2 to be processed. The mechanical construction of such a machine is generally known and is not described here in any further detail. The rotogravure cylinder 2 is rotatably mounted at its shaft ends 3 on shaft bearings 4 and is rotated by a rotational drive 5 at a given constant rotational speed. An optical lens 7 is arranged on a movable carriage 6 which can be moved back and forth in the longitudinal direction of the rotogravure cylinder 2 (see arrow). An optoacoustic modulator 8 with an electrical RF generator 9 and an absorber 10 are provided, together with a laser light source 11, on a stationary table 12. The laser beam 13 emitted from the laser light source 11 is deflected by a mirror 14 and directed onto the optoacoustic modulator 8. Provided between the modulator 8 and the optical lens 7 is a long flexible optical waveguide 15 with a convex lens 16 which couples the laser beam 13. The optical waveguide 15 has a diameter of about 0.5 mm with an external protective sleeve with a diameter of about 10 mm and a typical length of about 25 m. A Q-switched Nd:YAG laser with a wavelength of 1.064 $\mu$m has proved to be especially expedient as laser light source 11. In the preferred application, these lasers are used in multimode operation in which the next higher orders (TEM$_{mn}$; with n, m as integral numbers) superimpose the transversely fundamental mode TEM$_{00}$, as a result of which the power of the laser beam pulse is increased significantly. An essential factor in this case is that the lasers provide a train of identical pulses with very small tolerance deviations of +/−0.5% which have long-term stability in energy and peak performance. The energy of a single laser pulse is typically about 5 mJ to 10 mJ.

Figure 3:
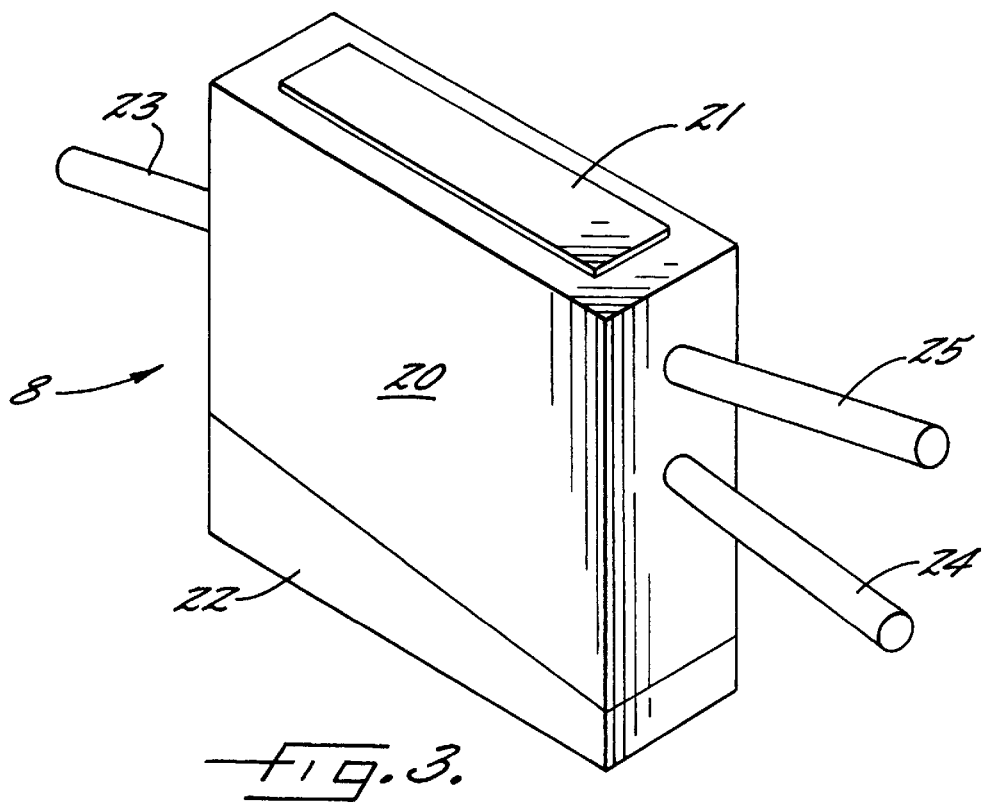
FIG. 3 shows a perspective illustration of an optoacoustic modulator.
Figure 4:
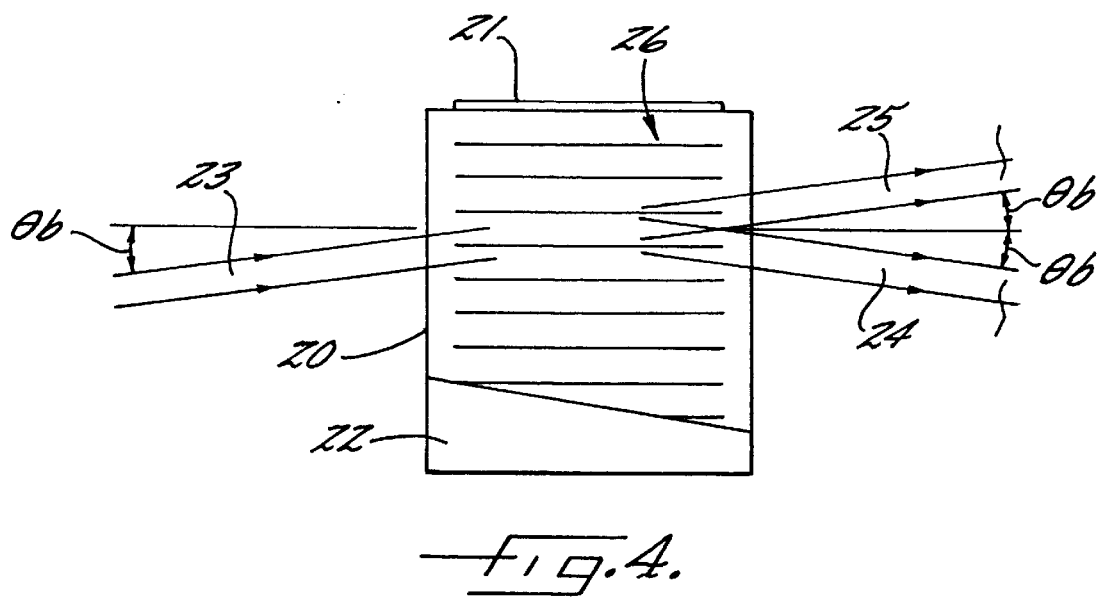
FIG. 4 shows a diagrammatic illustration to explain the functioning of the optoacoustic modulator.

The principle structure and functioning of the optoacoustic modulator 8 will now be described with reference to FIGS. 3 and 4. The modulator 8 consists of a cuboid transparent medium 20, for example made of flint glass or quartz glass, with a piezoelectric transducer 21 on the top and an acoustic absorber 22 on the bottom. A radio frequency signal is applied to the transducer 21 so that a sound field 26 travels from the top to the bottom through the transparent medium 20 which forms a kind of diffraction grid for the incident laser beam 23. As is a similar case with the X-ray optical diffraction grid, the maximum deflection efficiency is achieved at the Bragg angle $\Theta_b$, which is defined as $$\Theta_b = \lambda \times F / 2V$$

where

λ=wavelength of the incident laser beam 23
F=frequency of the sound field 26 applied
V=velocity of the soundwave in the medium 20.

The deflected laser beam 24 emerging is denoted in a known manner by the radiation of the first order and intensity $I_1$ and the non-deflected laser beam 25 emerging by the radiation of zeroth order and intensity $I_0$. The intensity of the deflected laser beam 24 or the deflection efficiency is clearly dependent on the electrical RF power applied, such that the latter can be used for the amplitude modulation of the incident laser beam 23, the intensity $I_1$ achieving up to 90% of the intensity of the incident laser beam 23. The non-deflected laser beam 25 is destroyed in the absorber 10 (cf. FIG. 1). The deflection efficiency depends primarily on the careful adaptation of the sound field 26 in geometry and divergence to the parameters of the pulsed laser beam 23. Using the optoacoustic modulator 8, the amplitude of the laser beam 23 can therefore be adapted to the requirements very quickly and accurately since the build-up of the sound field 26 takes place within the transparent medium 20 at the speed of sound.

If the laser light source 11 is used in multimode operation, owing to the greater diameter and the greater divergence of the laser beam 13 in comparison with a laser beam with a $TEM_{00}$ mode a sound field height of about 8 mm is required, which is maintained at an electrical RF power of about 50 W. In long-term operation, however, such a high electric RF power very rapidly leads to destruction of the transparent medium 20. However, it has been shown that discontinuous operation does not destroy the transparent medium 20 even at such high RF powers.

Figure 5:
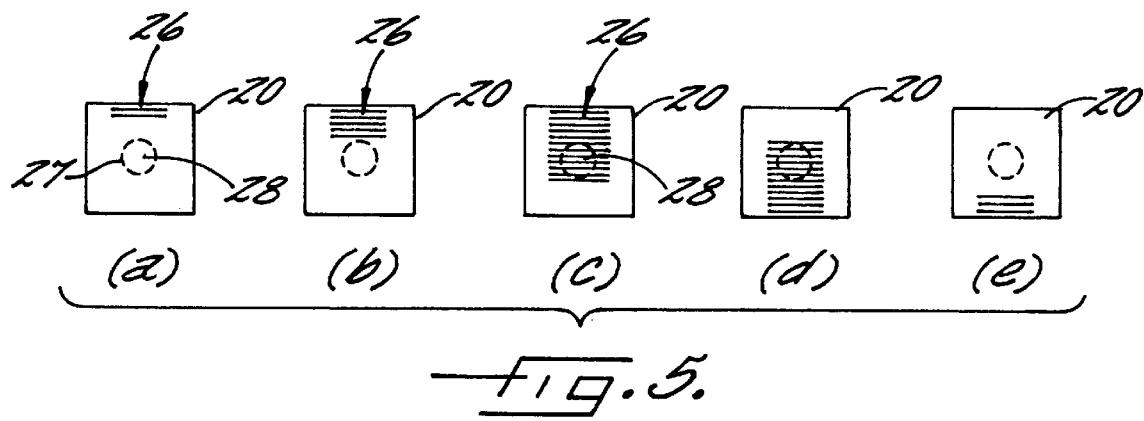
FIG. 5 shows an illustration of a travelling sound field and a laser beam pulse over time.
Figure 6:
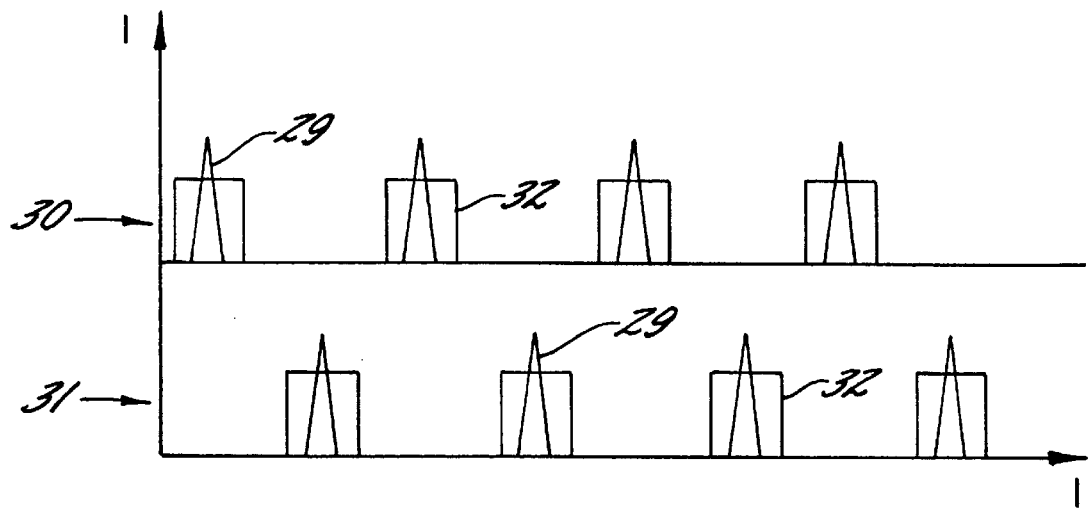
FIG. 6 shows an illustration of the laser pulses of the two laser light sources of FIG. 2.

This type of operation can be explained with reference to FIGS. 5a to 5e, which each illustrate a momentary reflection of the optoacoustic modulator at successive points in time, as follows:

When an electrical RF power is applied to the piezoelectric transducer 21, the sound field 26 spreads from the top of the transparent medium 20 at the speed of sound (cf. FIGS. 5a and 5b). In this case, the sound field 26 has not yet reached the outside circumference 27 of the laser beam pulse 28 passing through the medium 20. The dashed illustration of the circumference 27 indicates that the laser beam pulse 28 has not yet reached the medium 20. Not until the sound field 26 completely covers the outside circumference 27 (FIG. 5c) is the laser beam pulse 28 sent through the medium. The electrical RF power applied to the piezoelectric transducer 21 is subsequently switched off so that the end of the sound field 26 still completely covers the laser beam path 28 when the latter emerges from the transparent medium 20 (FIG. 5d). The sound field 26 then leaves the transparent medium 20 and is destroyed in the acoustic absorber 22 (FIG. 3). The switched-on period of the sound field 26 thus results in principle from the diameter and the passage time of the laser beam pulses 28 and from the speed of sound of the excited sound field 26 in the transparent medium 20. Additionally, consideration must be given to the period which elapses until the sound field 26 has spread out to the circumference 27 of the laser beam pulse 28 to pass through. A sequential and spatially congruent superimposition of the laser beam pulse 28 by the sound field 26 thus takes place without having to accept any loss of beam quality.

The laser power is given off, for example, for boring the wells 18 with a pulse duty factor of 1:33. With a diameter of about 8 mm for the multimode laser beam pulse with the beam path 28, the resultant switched-on time for the sound field 26 is, for example, about 3 μs, which constitutes ten times the duration of the individual laser beam pulse of, for example, 300 ns. The mean thermal loading of the transparent medium 20 which is brought about by the sound field 26 can thus be reduced by a factor of 10. Very high deflection efficiencies are thus achieved for multimode laser radiation. This mode of operation has the additional advantage of considerable energy saving.

Figure 2:
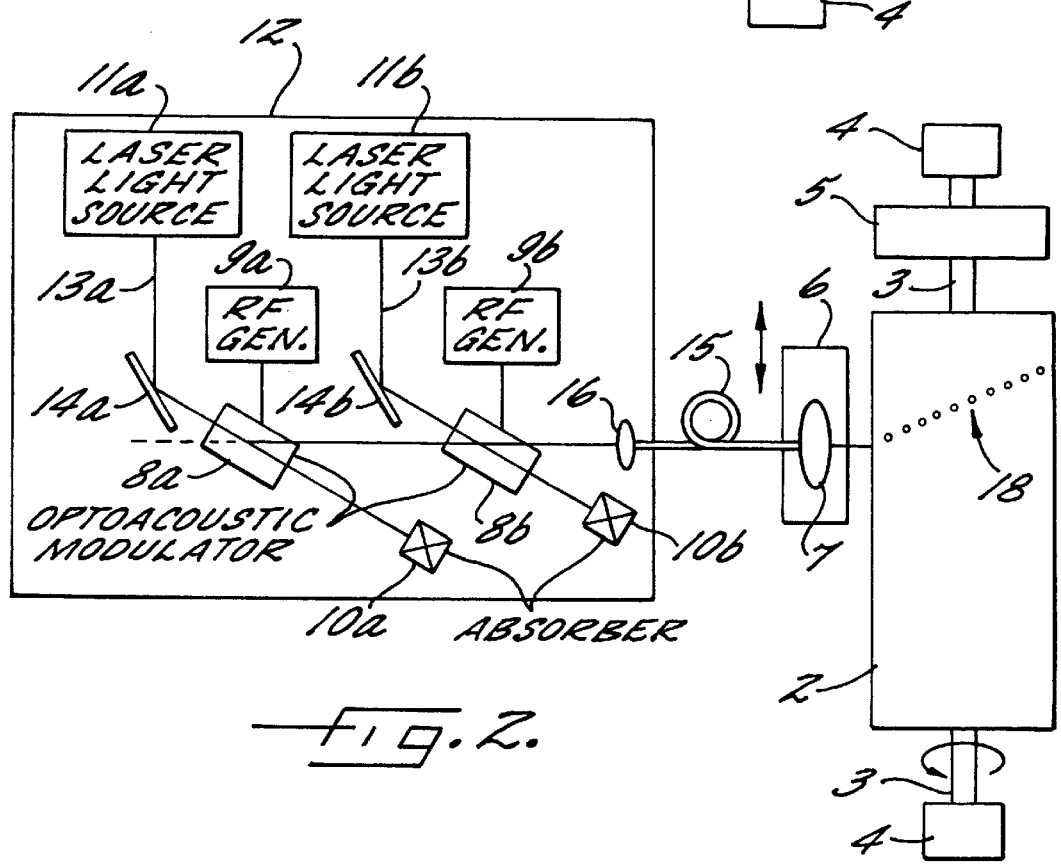
FIG. 2 shows a laser engraving machine with a rotogravure cylinder to be processed with two laser light sources.

The speed of the laser engraving machine 1 can be increased even further by the fact that, as illustrated in FIG. 2, a plurality of laser light sources 11a, 11b are used in parallel, whose laser beams 13a and 13b are directed coaxially onto the optical lens 7. This means that, for example, the laser beam 13a is deflected by the optoacoustic modulator 8a and then passes in a straight line in the optical axis of the lens 7 through the optoacoustic modulator 8b. For this purpose, the laser beam pulse train 30 of the laser light source 11a is offset in time relative to the laser beam pulse train 31 of the laser light source 11b. However, the pulse duty factor and the maximum amplitude of the two laser light sources 11a and 11b are exactly the same. The step function response 32 belonging to a single laser beam pulse 29 for the sound field 26 is likewise illustrated. The offset in time between the laser beam pulse trains 30 and 31 is selected to ensure that they do not overlap. A further condition for this mode of operation is that the sound field 26 of the optoacoustic modulator 8b is not switched on when a laser beam pulse 29 of the laser beam pulse train 30 is passed through. For this purpose, the laser light sources 11a and 11b and the sound fields 26 generated in the optoacoustic modulators 8a and 8b are synchronized in pairs and are offset in time relative to one another by an integral fractional number of the pulse duty factor. The maximum number of superimposed laser beams which can be operated sequentially in the above manner results from the ratio of the pulse duration of a single laser beam pulse 29 to the switched-on duration of the sound field 26 multiplied by the pulse duty factor of the laser beam source 11. With a pulse duration of about 300 ns and a switched-on duration of about 3 μs, this results, with a pulse duty factor of 1:33, in a maximum number of eleven laser light sources, i.e. in practice ten. The rotational speed and the speed of processing of the surface of the rotogravure cylinder 2 can thus be increased again by ten times. In order to compensate for any distortions of the wells 18 to be formed occurring at these high rotational speeds, the optoacoustic modulator 8 can additionally be provided with a control (not illustrated) which applies a frequency modulation signal, superimposed on the electrical RF power applied, to the optoacoustic modulator in order to adjust the laser beam 13 in the manner described in detail in WO-A-92/09399 mentioned at the beginning. Other adjustment mechanisms, such as a rotary mirror or swivel prism, may also be used as an alternative.

We claim:

1. Method for producing wells in a surface of a rotogravure cylinder comprising the steps of:

generating a plurality of pulsed laser beams, with the laser beam pulses having the same pulse duty factor but being offset in time relative to one another, adjusting the power of the generated laser beam pulses of each laser beam in such a manner that it is sufficient for removing a maximum volume needed for a well, deflecting each of said plurality of pulsed laser beams coaxially by means of an associated optoacoustic modulator by diffraction, controlling the pulse power of the laser beam pulses of each laser beam by means of the associated modulator in accordance with the volume of the well to be formed, feeding the pulsed laser beams deflected by means of said modulators into a single optical waveguide so as to align the pulsed laser beams with an optical axis of an optical lens, and directing the pulsed laser beams onto a surface of a rotogravure cylinder via said lens.

2. Method according to claim 1, wherein the laser beams are emitted as a multimode TEM wave.

3. Method according to claim 1, wherein each optoacoustic modulator generates a sound field which timely overlaps a passage time of the associated laser beam pulse through a transparent medium of the modulator.

4. Method according to claim 1, characterized in that the optoacoustic modulators simultaneously adjust the position of the laser beams in accordance with a rotational speed of the rotogravure cylinder to be processed.

5. An apparatus for producing wells in a surface of a rotogravure cylinder, comprising:

a plurality of pulsed laser light sources, said laser light sources generating laser beam pulses with the same pulse duty factor, but offset in time relative to one another, an optical lens having an optical axis for directing a laser beam onto a surface of a rotogravure cylinder to be processed, an optoacoustic modulator assigned to each laser light source and positioned for receiving and deflecting the received laser beam pulses by diffraction, each of said modulators also controlling the received laser beam pulses in their pulse power in accordance with a volume of the well to be formed, and a single optical waveguide arranged between said modulators and said optical lens for directing the laser beam pluses emanating from said modulators to the optical axis of the optical lens.

6. The apparatus according to claim 5, wherein each of said optoacoustic modulators comprises a switching device for synchronizing a sound field generated by the modulators with a passage time of the laser beam path through a transparent medium of the modulators in a timely overlapping manner.

7. The apparatus according to claim 5, wherein each of said optoacoustic modulators further comprises a control means for adjusting the position of the laser beams by modulation of a sound field in the associated optoacoustic modulator in accordance with a rotational speed of a rotogravure cylinder to be processed.

8. The apparatus according to claim 5 wherein said rotogravure cylinder defines a longitudinal axis, wherein said optical lens is mounted on a carriage which is moveable back and forth in a direction parallel to the longitudinal axis of the rotogravure cylinder, and wherein said optical waveguide is flexible so as to accommodate such movement.

9. The apparatus according to claim 8 further comprising a convex lens positioned to couple the pulsed laser beams with said waveguide.

* * * * *